(12) United States Patent
Takeuchi et al.

(10) Patent No.: US 8,713,219 B2
(45) Date of Patent: Apr. 29, 2014

(54) SWITCHING DEVICE, SWITCH CONTROL METHOD, AND STORAGE SYSTEM

(75) Inventors: Toshiaki Takeuchi, Kawasaki (JP); Masakazu Sakamoto, Kawasaki (JP); Tetsuya Kinoshita, Kawasaki (JP); Jun Takeuchi, Kawasaki (JP); Atsushi Shinohara, Kawasaki (JP); Yusuke Kurasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 13/014,375

(22) Filed: Jan. 26, 2011

(65) Prior Publication Data

US 2011/0191519 A1 Aug. 4, 2011

(30) Foreign Application Priority Data

Feb. 1, 2010 (JP) ................. 2010-020725

(51) Int. Cl.
G06F 3/00 (2006.01)
G06F 13/12 (2006.01)
G06F 13/38 (2006.01)
G06F 13/36 (2006.01)

(52) U.S. Cl.
USPC ....... 710/52; 710/6; 710/54; 710/57; 710/310

(58) Field of Classification Search
USPC ................... 710/6, 52, 54, 57, 310
See application file for complete search history.

(56) References Cited

U.S. PATENT DOCUMENTS

| | | | | |
|---|---|---|---|---|
| 6,606,630 B1* | 8/2003 | Gunlock | .................... | 707/783 |
| 6,732,193 B1* | 5/2004 | Burton et al. | .................... | 710/5 |
| 6,922,414 B1* | 7/2005 | Gunlock | .................... | 370/412 |
| 6,952,734 B1* | 10/2005 | Gunlock et al. | ............... | 709/227 |
| 7,606,944 B2* | 10/2009 | Kalwitz et al. | .................... | 710/5 |
| 7,752,362 B2 | 7/2010 | Nishimoto et al. | | |
| 7,849,167 B2* | 12/2010 | McNutt et al. | ................. | 709/221 |
| 2002/0174295 A1 | 11/2002 | Ulrich et al. | | |
| 2002/0174296 A1* | 11/2002 | Ulrich et al. | .................... | 711/114 |
| 2008/0104283 A1* | 5/2008 | Shin et al. | .................... | 710/6 |
| 2008/0104360 A1 | 5/2008 | Takeuchi et al. | | |

FOREIGN PATENT DOCUMENTS

| | | |
|---|---|---|
| JP | 2000-010897 | 1/2000 |
| JP | 2006-285809 | 10/2006 |
| JP | 2006-524864 A | 11/2006 |
| JP | 2008-112399 | 5/2008 |
| WO | WO 2004/095287 | 11/2004 |

OTHER PUBLICATIONS

"Japanese Office Action" mailed by JPO and corresponding to Japanese application No. 2010-020725 on Oct. 1, 2013, with English translation.

* cited by examiner

*Primary Examiner* — Henry Tsai
*Assistant Examiner* — Eric Oberly
(74) *Attorney, Agent, or Firm* — Fujitsu Patent Center (57) ABSTRACT

A queue number acquiring unit acquires a command queuing number that is the upper limit of the number of process-waiting instructions that can be stored in each of storages that make up a virtual disk for each storage. A minimum queue number selecting unit selects the minimum value of the command queuing numbers of the storages that make up the virtual disk as a minimum queue number. A queue number setting unit sets the selected minimum queue number as the command queuing number of the virtual disk that includes the storage device of which the command queuing number is selected as the minimum queue number for each virtual disk.

5 Claims, 9 Drawing Sheets

SWITCHING DEVICE, SWITCH CONTROL METHOD, AND STORAGE SYSTEM

CROSS-REFERENCE TO RELATED APPLICATION

This application is based upon and claims the benefit of priority of the prior Japanese Patent Application No. 2010-020725, filed on Feb. 1, 2010, the entire contents of which are incorporated herein by reference.

FIELD

The embodiments discussed herein are directed to a switching device, a switch control method, and a storage system.

BACKGROUND

A storage system that realizes high-capacity data storage by using a plurality of storage media has been recently generalized. The storage system includes, for example, a storage area network (SAN). In the storage system, a network consisting of a switching device (hereinafter, simply referred to as a "switch"), a cable, and the like is formed between a computation device and a storage device. The computation device is, for example, a server that processes data, and is referred to as a host. Moreover, the storage device is a device that includes a storage medium such as a hard disk, and is referred to as a storage device. The writing and reading of data are performed by transmitting and receiving a frame including data and a command on the network between the computation device and the storage device. At this time, the computation device transmits a command to a storage device that becomes a target of the writing or reading of data as an initiator. In other words, the computation device leads a process inside the storage system and the storage device is passively activated.

Recently, a fibre channel (FC) can be used as a connection cable in order to transmit and receive data between a computation device and a storage device by using light. When the fiber channel is used, a host bus adapter (HBA) that has a transmission/reception port for optical transmission of data is provided in the computation device. Moreover, a channel adapter (CA) is provided in the storage device, and transmission and reception for optical transmission of data is performed via the CA. A switch that is used for the configuration using the fiber channel is, particularly, referred to as a fiber channel switch (FC switch).

Furthermore, as an FC switch, there is proposed a virtualized FC switch that has a function for virtualizing a physical disk that is a physical storage medium to make up one or a plurality of virtual disks. Specifically, a virtualized FC switch configures an arbitrary storage area of a storage device connected thereto as a virtual disk. The virtualized FC switch has a function for providing the virtual disk to a host through a virtual target (VT). In this case, a configuration made by gathering a plurality of virtual disks provided by one virtual target is referred to as a "virtual storage". Hereinafter, when it is simply referred to as a storage device, it is assumed that it indicates a physical storage device. Moreover, a switch that has a function for moving data from a virtual disk in operation to another virtual disk is also proposed as a virtualized FC switch.

Figure 8:
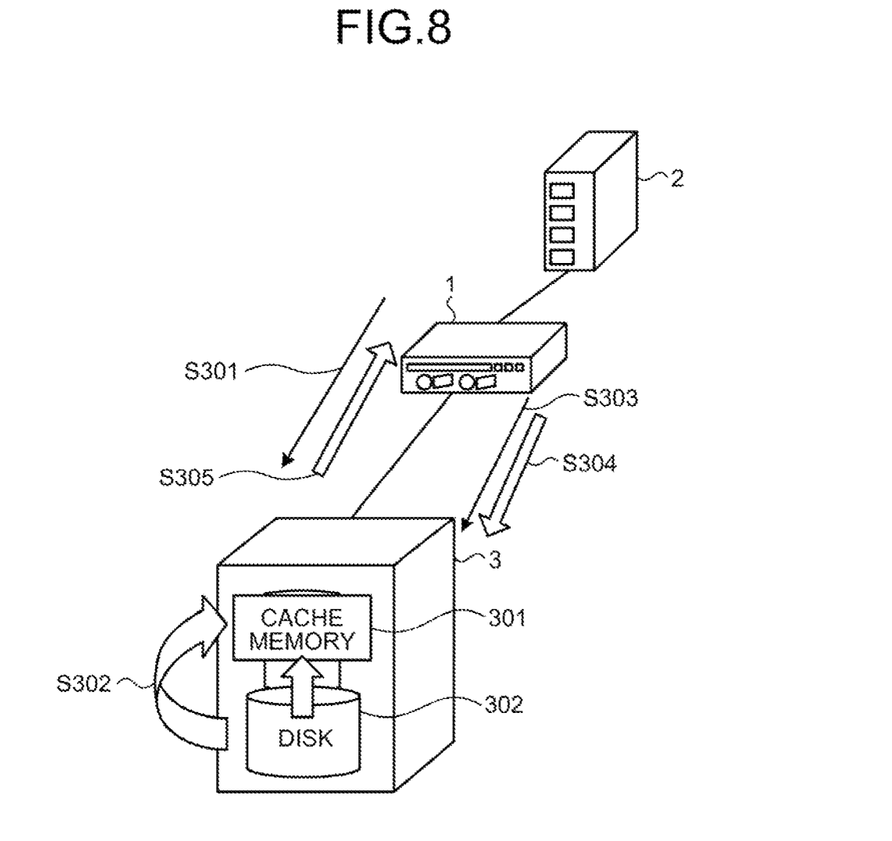
FIG. 8 is a diagram explaining a command queuing.
Figure 9:
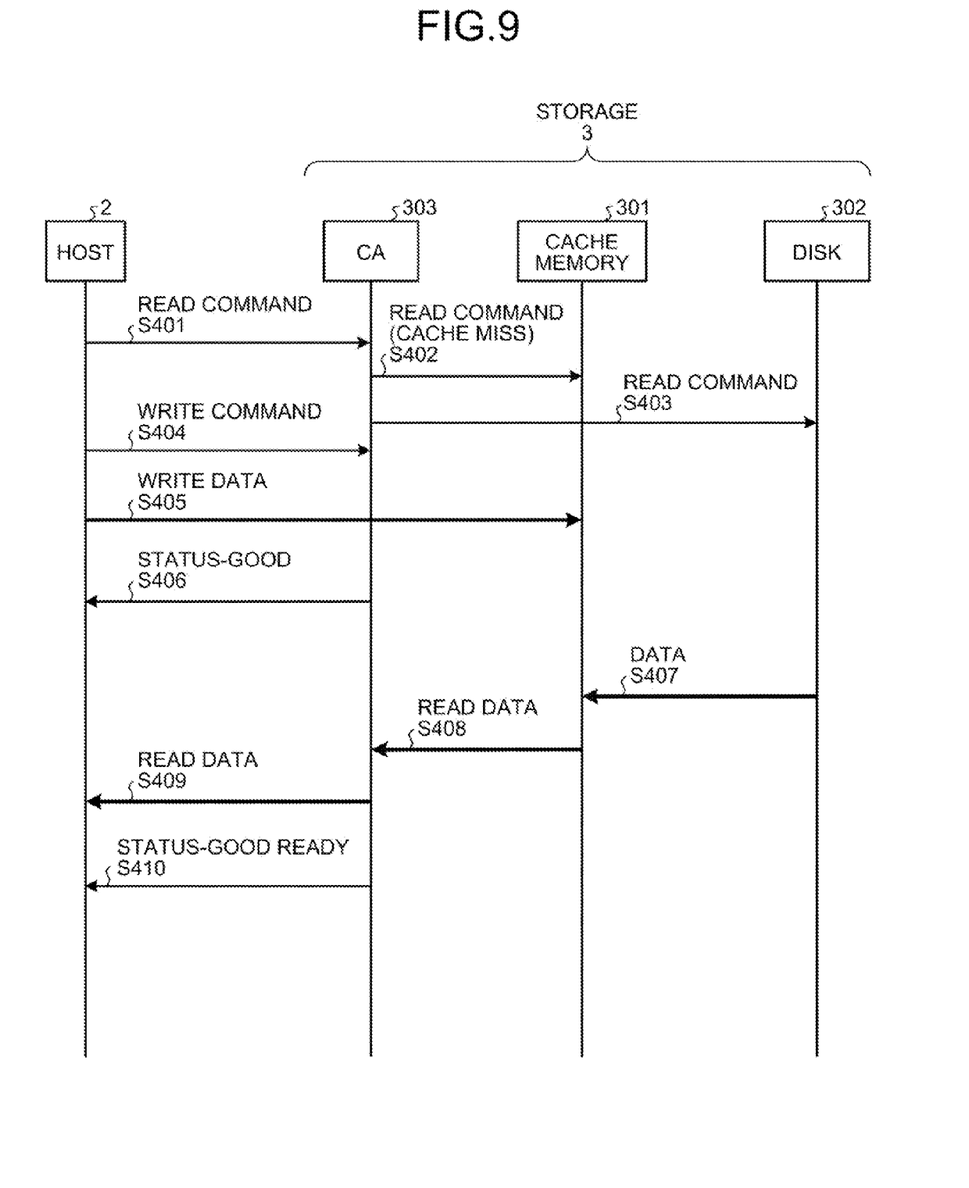
FIG. 9 is a sequence diagram during a command queuing.

In this case, a storage device generally has a function for simultaneously receiving a plurality of commands from a computation device and inputting the received commands into a queue in order to raise an I/O performance. It is called a command queuing. In this case, an I/O performance means, for example, a performance for the input and output of data. FIG. 8 is a diagram illustrating a command queuing. FIG. 9 is a sequence diagram during a command queuing. A vertical axis of FIG. 9 indicates the temporal operations of a host 2, a CA 303, a cache memory 301, and a disk 302 from the left side of the drawing. Moreover, each vertical axis indicates that a time passes toward the bottom of the drawing. Moreover, the disk 302, the cache memory 301, and the CA 303 are included in a storage 3 that is a storage device.

In FIG. 8, it will be explained about the case where a Read command for data in an area called a block A of the disk is issued from the host 2 (S301). In this case, if the requested data is not in the cache memory 301, the storage 3 reads out data in the block A from the disk 302 and stores the data in the cache memory 301 (S302). After that, the storage 3 transfers the data stored in the cache memory 301 to the host 2 (S305). Therefore, a waiting time from reading data to storing the data in the cache memory 301 occurs until the data in the block A is sent from the storage 3 to the host 2.

Therefore, while the data in the block A is being read out from the disk 302 (S302), the host 2 issues a Write command to a block B that is another area in the disk 302 (S303). Data for the Write command is first stored in the cache memory 301. In this way, because a process for the Write command does not require the reading from the hard disk, the process for the Write command is promptly performed without waiting for the reading of data in the block A (S304).

Furthermore, it is serially explained about a command queuing operation of each device with reference to FIG. 9. The host 2 transmits a Read command to the CA 303 (S401). The CA 303 transmits the Read command to the cache memory 301 (S402). At this time, when the requested data is not in the cache memory 301, in other words, in the case of a cache miss, the CA 303 transmits the Read command for the cache memory 301 to the disk 302 (S403). In this case, the host 2 transmits a Write command to the CA 303 (S404). Then, data is written into the cache memory 301 via the CA 303 (S405). Then, when the writing is completed, the CA 303 transmits a writing success notification to the host 2 (S406). In the meantime, the CA 303 makes the disk 302 transmit the data requested at S403 to the cache memory 301 and stores the data in the cache memory 301 (S407). Next, the storage 3 transmits the data stored in the cache memory 301 to the CA 303 (S408). The CA 303 transmits the received data to the host 2 (S409). Then, the CA 303 outputs a reading success notification (including an all-process completion notification) to the host 2 (S410). According to this, a time from sending the Read command to the cache memory 301 (S402) to writing data into the cache memory 301 (S407) can be efficiently used.

In this case, a command queuing number that is an upper limit of process-waiting executable instructions (commands) that can be stored is different depending on storage devices. "Storing" is to store the executable instructions in a storage device until the process is performed. Moreover, an executable instruction means an instruction for making a storage perform a process such as a reading process and a writing process. An operator uses each storage after setting a command queuing number of each storage device connected to a computation device in a device driver of the computation device.

A virtual storage can merge storage areas of plural kinds of storage devices to look like one virtual disk regardless of the types of storage devices. In this case, the command queuing number set in the device driver of the computation device cannot exceed a command queuing number of each storage device that makes up the virtual disk.

Figure 10:
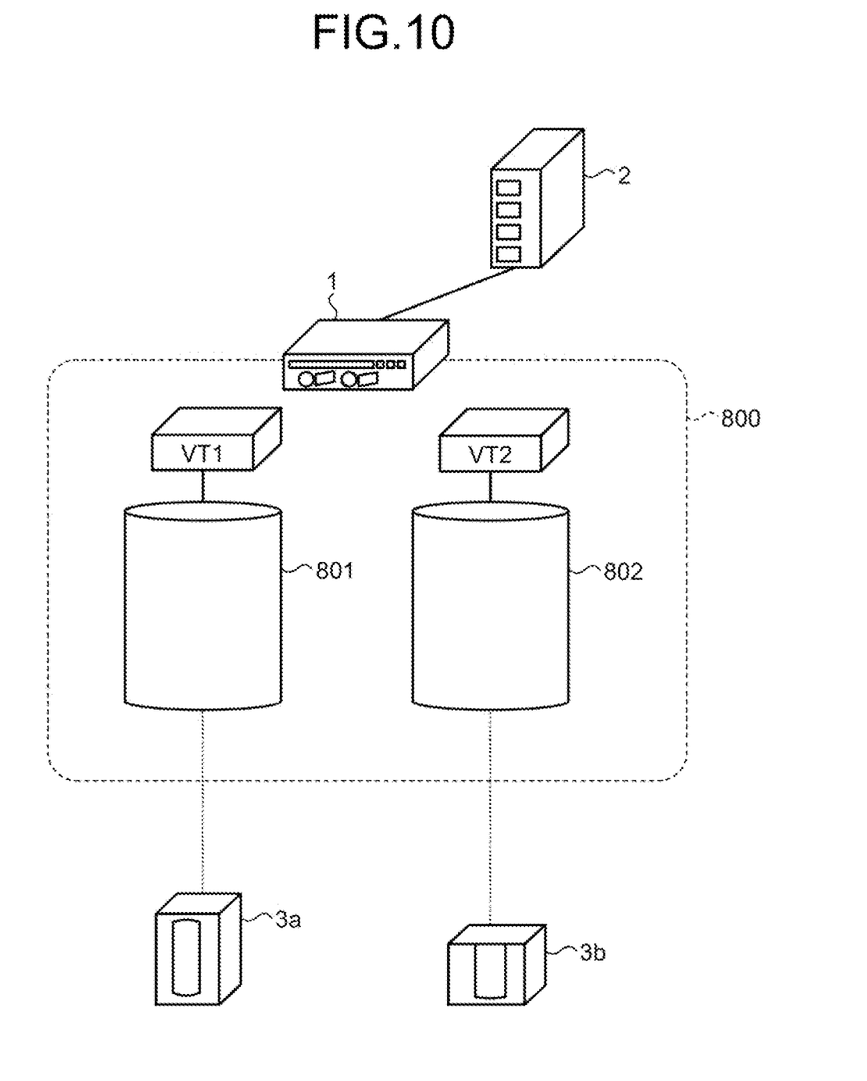
FIG. 10 is a configuration diagram of a virtual storage system that is constructed by storage devices of which the command queuing numbers are different.

Now, it will be explained about a command queuing number of each virtual disk when a virtual disk is made up of storages 3a and 3b of which the command queuing numbers are different with reference to FIG. 10. FIG. 10 is a configuration diagram of a virtual storage system that is made up of storage devices of which the command queuing numbers are different. The host 2 transmits and receives data to and from the storage 3a and the storage 3b via an FC switch 1. The FC switch 1 manages each virtual storage and each virtual disk as a virtual storage system 800. The virtual storage system 800 is surrounded with a dotted line in FIG. 10. Dotted lines that link virtual disks 801 and 802 to the storages 3a and 3b indicate which of the storage devices makes up the respective virtual disks as physical disks.

In this case, it is assumed that the command queuing number of the storage 3a is 30 and the command queuing number of the storage 3b is 10. By doing so, because the virtual disk 801 is made up of the physical disk of the storage 3a, the upper limit of the command queuing number becomes 30. On the contrary, because the virtual disk 802 is made up of the physical disk of the storage 3b, the upper limit of the command queuing number becomes 10. In this way, the command queuing number of the virtual disk is determined by the command queuing number of a storage device that makes up the virtual disk.

As a technology for managing storages having different performances in this way, a technology for managing dedicated storage devices having different storage device types by using one management rule in which the management methods of the dedicated storage devices are defined is conventionally proposed. This technology has been known as disclosed in, for example, Japanese National Publication of International Patent Application No. 2006-524864.

In this case, an operator can freely decide a combination of storage devices that make up virtual disks. In other words, a settable command queuing number may be different for each virtual disk. On the contrary, a command queuing number of a virtual disk has been conventionally set in a unit of a virtual storage system. In other words, the same command queuing number is set for all virtual disks included in the virtual storage system. In this way, according to the conventional method, it is difficult to effectively utilize a command queuing performance of storage devices that make up a storage system.

Moreover, a technology for managing a plurality of dedicated storage devices by using one management rule described above is a technology for managing physical storage devices in accordance with the types of the storage devices. Therefore, even if the technology is used, it is difficult to effectively utilize a command queuing performance of the storage devices that make up the virtual storage system.

SUMMARY

According to an aspect of an embodiment of the invention, a switching device includes a queue number acquiring unit that acquires command queuing numbers of a plurality of storage devices that make up a virtual disk as a virtual storage medium, each of the command queuing numbers indicating an upper limit of a number of process-waiting instructions that can be stored in the corresponding storage device; a minimum queue number selecting unit that selects a minimum value of the command queuing numbers as a minimum queue number; and a queue number setting unit that sets the selected minimum queue number as a command queuing number of the virtual disk that includes the storage device of which the command queuing number is selected as the minimum queue number.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments explained below.

[a] First Embodiment

Figure 1:
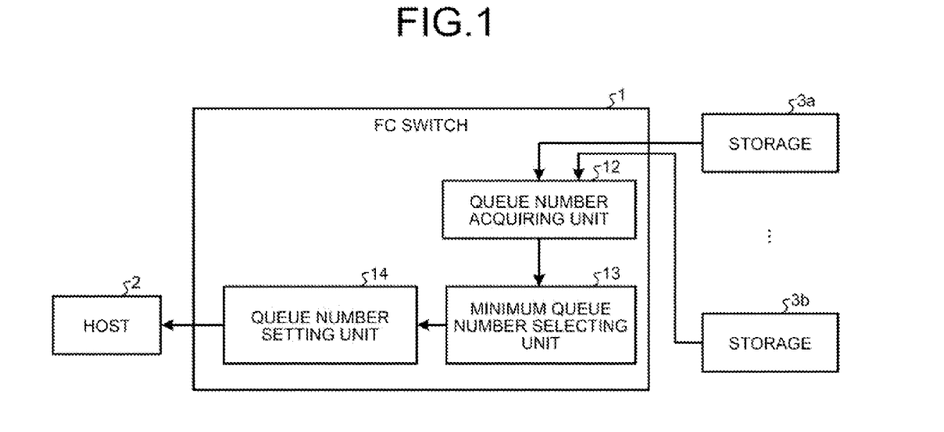
FIG. 1 is a block diagram of a storage system that uses a switching device according to a first embodiment.

FIG. 1 is a block diagram of a storage system that uses a switching device according to a first embodiment.

As illustrated in FIG. 1, the storage system that uses the switching device according to the present embodiment includes an FC switch 1 that is a switching device, a host 2 that is a computation device, and storages 3a and 3b that are a plurality of storage devices. In this case, the number of storage devices is not restricted if the number of the storage devices is multiple. Hereinafter, when the storages 3a and 3b are not separately distinguished, the storages 3a and 3b are simply referred to as "storages 3".

The FC switch 1 and the host 2 are connected to each other by using a fiber channel. The FC switch 1 and the host 2 transmit and receive data by using the fiber channel. Moreover, the FC switch 1 and the storages 3 are connected to each other by using fiber channels, and data is transmitted and received between the FC switch 1 and the storages 3.

The FC switch 1 includes a queue number acquiring unit 12, a minimum queue number selecting unit 13, and a queue number setting unit 14.

The queue number acquiring unit 12 acquires, from an outside, the identification information of each virtual disk and the identification information of the storage 3 having a physical disk that makes up each virtual disk. In the following descriptions, the storage 3 having a physical disk that makes up a virtual disk is referred to as "the storage 3 that makes up the virtual disk". In this case, the number of the virtual disks may be one or multiple. In the following descriptions, it is explained about the case where the number of the virtual disks is multiple.

Furthermore, the queue number acquiring unit 12 acquires a command queuing number from each storage 3 that has the acquired identification information. In this case, a command queuing number means the upper limit of the process-waiting executable instructions (commands) that can be stored in each storage 3. In this case, an executable instruction means an instruction that makes the storage execute a process such as a reading process and a writing process. The queue number acquiring unit 12 outputs the command queuing number of the storage 3 that makes up each virtual disk and the identification information of each virtual disk to the minimum queue number selecting unit 13.

The minimum queue number selecting unit 13 selects, for each virtual disk, the command queuing number that is the minimum value from the command queuing numbers of the storages 3 that make up the virtual disks. The minimum command queuing number is below referred to as a "minimum queue number". The minimum queue number selecting unit 13 then outputs the identification information of each virtual disk to the queue number setting unit 14. Moreover, the minimum queue number selecting unit 13 outputs the selected minimum queue number to the queue number setting unit 14 as the minimum queue number of the virtual disk related to the identification information.

The queue number setting unit 14 receives the identification information of each virtual disk and the minimum queue number of each virtual disk from the minimum queue number selecting unit 13. The queue number setting unit 14 informs the host 2 of the identification information of each virtual disk and the minimum queue number of each virtual disk. As a result, the queue number setting unit 14 sets the minimum queue number as the command queuing number of the virtual disk that has the identification information input from the minimum queue number selecting unit 13.

As described above, in the present embodiment, the minimum value of the command queuing numbers of the storages that make up the respective virtual disks can be automatically set as the command queuing number of the virtual disk. In this way, the queue number setting unit 14 does not determine one command queuing number for the whole of the storage system but determines a command queuing number for each virtual disk. Therefore, the maximum command queuing number that can be used for each virtual disk can be automatically set. As a result, a command queuing performance of storage devices that make up the storage system can be effectively utilized.

[b] Second Embodiment

Figure 2:
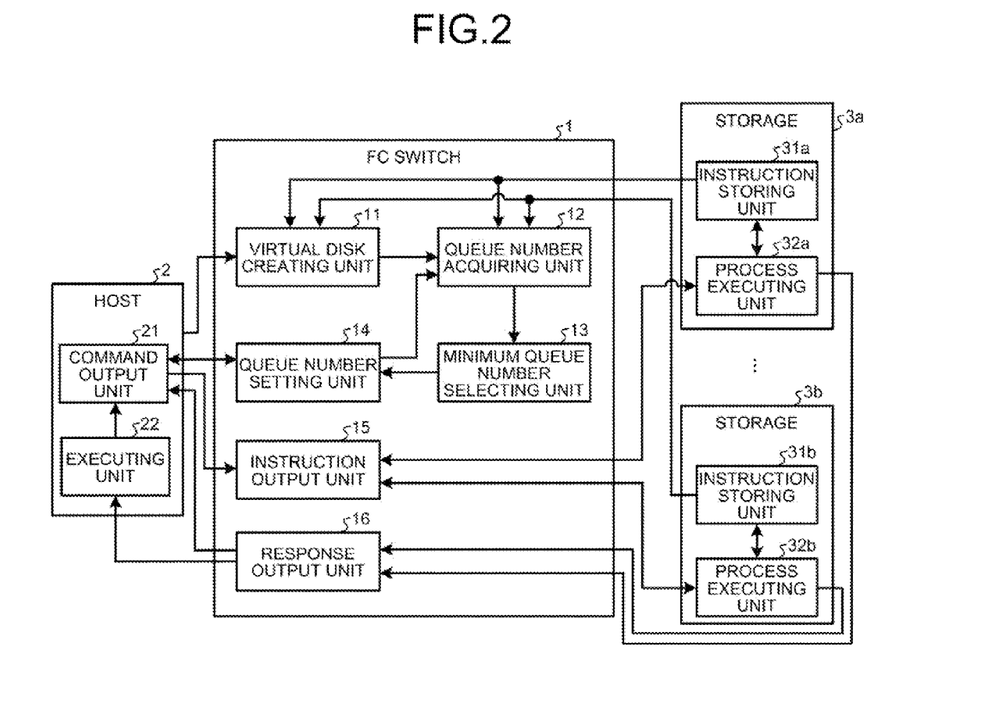
FIG. 2 is a block diagram of a storage system that uses a switching device according to a second embodiment.

FIG. 2 is a block diagram of a storage system that uses a switching device according to the second embodiment. As illustrated in FIG. 2, the storage system according to the present embodiment includes the FC switch 1, the host 2, and the storages 3a and 3b (hereinafter, simply "the storages 3" when the storages are not separately distinguished). In this case, although the two storages 3 are illustrated as an exemplification in FIG. 2, the number of the storages 3 may be three or more. Moreover, similarly to the first embodiment, it is assumed that the FC switch 1 and the host 2 are connected and the FC switch 1 and the storages 3 are connected by using fiber channels in the present embodiment.

The FC switch 1 includes a virtual disk creating unit 11, the queue number acquiring unit 12, the minimum queue number selecting unit 13, the queue number setting unit 14, an instruction output unit 15, and a response output unit 16. Moreover, the host 2 includes a command output unit 21 and an executing unit 22. Furthermore, the storages 3a and 3b respectively includes instruction storing units 31a and 31b and process executing units 32a and 32b.

The virtual disk creating unit 11 includes a storage medium such as a memory and a hard disk. The virtual disk creating unit 11 acquires configuration information of each physical disk from the storages 3a and 3b. Then, the virtual disk creating unit 11 stores the configuration information of each physical disk of the storages 3a and 3b in the storage medium thereof.

Furthermore, the virtual disk creating unit 11 receives, from the host 2, the designation of configuration information of a virtual disk and the input of a virtual disk creation instruction. In this explanation, although the virtual disk creating unit 11 receives the input of a virtual disk creation instruction from the host 2 as an example, the virtual disk creating unit 11 may receive the input of a creation instruction from another management terminal that is not illustrated. In this case, the designation of the configuration of a virtual disk includes at least the designation of the storages 3 that make up the virtual disk, the designation of hard disks that are used in the storages 3, and the designation of the memory capacity of the virtual disk. Then, the virtual disk creating unit 11 creates a virtual disk in such a manner that the configuration of the designated virtual disk is satisfied. Specifically, the virtual disk creating unit 11 assigns appropriate identification information to the virtual disk to be created. Then, the virtual disk creating unit 11 stores the information of the storages 3 that make up the virtual disk, the information of the hard disks that are used in the storages 3, and the memory capacity of the virtual disk, in association with the identification information. As an example, it will be explained about the case where a virtual disk of identification information "00x" is made up by combining the hard disk of the storage 3a and the hard disk of the storage 3b. The virtual disk creating unit 11 receives the creation instruction and issues the identification information "00x" to the virtual disk to be created. Then, the virtual disk creating unit 11 stores the identification information of the storage 3a and the storage 3b and the identification information of the hard disks that are used in the storage 3a and the storage 3b in the storage medium thereof, in association with the identification information "00x". Furthermore, the virtual disk creating unit 11 stores the designated memory capacity and decides and stores a memory capacity to be used for each hard disk. In this case, when a plurality of hard disks is used, the virtual disk creating unit 11 decides a memory capacity to be used for each hard disk, for example, by equally dividing the designated memory capacity by the number of the hard disks.

Then, the virtual disk creating unit 11 outputs the identification information of the virtual disk and the identification information of the storages 3 that make up the virtual disk to the queue number acquiring unit 12. Hereinafter, it will be explained about a virtual disk having the identification information "00x" that is made up of the storage 3a and the storage 3b.

In this case, the present embodiment has a configuration that a virtual disk is created by the virtual disk creating unit 11 provided in the FC switch 1. However, the virtual disk creating unit 11 may not be provided in the FC switch 1. In that case, the queue number acquiring unit 12 as explained below acquires the identification information of each virtual disk and the identification information of storages making up the virtual disk from an external device that includes the virtual disk creating unit 11.

The queue number acquiring unit 12 receives the acquisition instruction of a command queuing number of each virtual disk from the queue number setting unit 14. After receiving the acquisition instruction of the command queuing number, the queue number acquiring unit 12 acquires, from the virtual disk creating unit 11, the identification information "00x" of the virtual disk and the identification information of the storages 3a and 3b that makes up the virtual disk. The queue number acquiring unit 12 inquires a command queuing number of the instruction storing unit 31a of the storage 3a that has the acquired identification information. Similarly, the queue number acquiring unit 12 inquires a command queuing number of the instruction storing unit 31b of the storage 3b that has the acquired identification information. For example, the queue number acquiring unit 12 outputs a Mode Sense command that is an SCSI (Small Computer System Interface) command to the storages 3a and 3b to inquire the command queuing number of the storages. Then, the queue number acquiring unit 12 receives responses from the instruction storing units 31a and 31b and acquires the command queuing numbers of the storages 3a and 3b. In the present embodiment, it is explained about the case where the command queuing number of the storage 3a is 30 and the command queuing number of the storage 3b is 10.

The queue number acquiring unit 12 outputs the command queuing numbers acquired for the storages 3a and 3b that make up the virtual disk having the identification information "00x" to the minimum queue number selecting unit 13 in association with the identification information "00x".

The minimum queue number selecting unit 13 receives the identification information "00x" of the virtual disk and the command queuing numbers of the storage 3a and the storage 3b from the queue number acquiring unit 12. In the present embodiment, the minimum queue number selecting unit 13 receives "30" as the command queuing number of the storage 3a. Moreover, the minimum queue number selecting unit 13 receives "10" as the command queuing number of the storage 3b. Then, the minimum queue number selecting unit 13 selects the smallest command queuing number among the received command queuing numbers as a minimum queue number. In this case, the minimum queue number selecting unit 13 selects "10" that is the command queuing number of the storage 3b as the minimum queue number. The minimum queue number selecting unit 13 then outputs the selected minimum queue number to the queue number setting unit 14 in association with the identification information of each virtual disk. In this case, the minimum queue number selecting unit 13 outputs "10" to the queue number setting unit 14 as the minimum queue number in association with the identification information "00x".

The queue number setting unit 14 receives the inquiry for the command queuing number of each virtual disk from the command output unit 21. For example, a Mode Sense command of SCSI is used as the inquiry. The queue number setting unit 14 outputs the acquisition instruction of the command queuing number of each virtual disk to the queue number acquiring unit 12.

Moreover, the queue number setting unit 14 acquires the identification information of each virtual disk and the minimum queue number corresponding to the virtual disk from the minimum queue number selecting unit 13. Then, the queue number setting unit 14 outputs the received minimum queue number to the command output unit 21 as a command queuing number in association with the identification information of the virtual disk. For example, the queue number setting unit 14 outputs "10" to the command output unit 21 as the command queuing number of the virtual disk of the identification information "00x", in association with the identification information "00x".

Because this explanation is about the setting of the command queuing number of a virtual disk that is made up of the storages 3a and 3b, the command queuing number is set to the command queuing number of the storage 3b of which the command queuing number is small. On the contrary, for example, in the case of a virtual disk of only the storage 3a, a minimum queue number is identical to the command queuing number of the storage 3a. Therefore, in this case, the queue number setting unit 14 sets the command queuing number of the virtual disk to "30" that is the command queuing number of the storage 3a. In this way, the command queuing number of the virtual disk can be set to a maximum value that can be used in the virtual disk. Therefore, a command queuing performance of the storages 3 that make up the storage system can be effectively utilized.

The instruction output unit 15 receives an executable instruction for reading and writing data from and into the virtual disk from the command output unit 21. The executable instruction includes the identification information of the virtual disk and the like. The instruction output unit 15 specifies a virtual disk corresponding to the input identification information. Then, the instruction output unit 15 outputs the executable instruction to the storages 3 that make up the specified virtual disk. For example, if it is a data reading instruction, the instruction output unit 15 outputs the executable instruction to the storage 3 having the hard disk in which the designated data is actually stored among the storages 3 that make up the virtual disk. Moreover, if it is a data writing instruction, the instruction output unit 15 selects an appropriate storage device from the storages 3 that make up the virtual disk and outputs the executable instruction to the selected the storage 3. For example, the selection of the storage device is performed by selecting a storage device for which the most capacity of the hard disk used in the virtual disk remains among the storages 3 that make up the virtual disk.

The response output unit 16 receives a response for the executable instruction from the storage 3. The response output unit 16 outputs the received response to the executing unit 22. Moreover, the response output unit 16 outputs a response output notification to the command output unit 21. In this case, although the response output unit 16 informs the command output unit 21 of the output of the response in the present embodiment, the present embodiment may have a configuration that the executing unit 22 that receives the response from the response output unit 16 informs the command output unit 21 of the response.

The command output unit 21 includes a storage medium such as a memory and a hard disk. The command output unit 21 inquires a command queuing number of the queue number setting unit 14. The inquiry is executed, for example, by outputting the Mode Sense command of SCSI by the command output unit 21. The timing of the inquiry is, for example, a timing or the like at that a power supply is applied to the host 2. Then, the command output unit 21 receives the command queuing number of each virtual disk corresponding to the identification information of the virtual disk from the queue number setting unit 14. Then, the command output unit 21 stores the command queuing number of each virtual disk in association with the identification information of the virtual disk.

Moreover, the command output unit 21 outputs the executable instruction for reading and writing data from and into the virtual disk to the instruction output unit 15. At this time, the command output unit 21 outputs the executable instruction to each virtual disk by using the command queuing number input from the queue number setting unit 14 as an upper limit. Specifically, the command output unit 21 outputs the executable instruction to the virtual disk, and stops outputting the executable instruction to the virtual disk when the number of the output executable instructions reaches the command queuing number of the virtual disk. After that, when the notification that the response to the executable instruction for the virtual disk is output is received from the response output unit 16, the command output unit 21 resumes outputting the executable instruction to the virtual disk.

The executing unit 22 executes an application that uses the storage 3. At this time, the executing unit 22 acquires a response of the storage 3 from the response output unit 16 to use the response for the execution of the application.

Next, it will be explained about the storages 3a and 3b. Each of the storage 3a and the storage 3b includes function parts that respectively have the same configurations. The instruction storing units 31a and 31b perform the same operation and the process executing units 32a and 32b perform the same operation. Therefore, it will be below explained about only the storage 3a. The operation and configuration of each function part are similar to those of the storage 3b.

The process executing unit 32a receives an executable instruction from the instruction output unit 15. When the process executing unit 32a can process the executable instruction, the process executing unit 32a performs a process such as a data reading process and a data writing process in accordance with the input executable instruction. On the contrary, when the process executing unit 32a cannot process a newly input executable instruction because the process is presently performed, the process executing unit 32a outputs the newly input executable instruction to the instruction storing unit 31a.

After processing the executable instruction, the process executing unit 32a outputs a response to the executable instruction to the response output unit 16.

The instruction storing unit 31a includes a storage medium such as a memory and a hard disk. The instruction storing unit 31a previously stores therein the command queuing number of the storage 3a. The instruction storing unit 31a receives the inquiry of a command queuing number from the queue number acquiring unit 12. Then, the instruction storing unit 31a outputs the command queuing number of the storage 3a that is stored therein to the queue number acquiring unit 12 in response to the inquiry of a command queuing number.

Moreover, the instruction storing unit 31a receives an executable instruction from the process executing unit 32a. The instruction storing unit 31a stores the received executable instruction in its storage area. At this time, the instruction storing unit 31a stores executable instructions by using the command queuing number stored therein as an upper limit. For example, when an executable instruction is newly input in a state where executable instructions corresponding to the command queuing number are stored, the instruction storing unit 31a sends back a response that a process cannot be performed to the process executing unit 32a. However, in the present embodiment, the command output unit 21 grasps a command queuing number of each virtual disk. Therefore, the instruction storing unit 31a does not receive an executable instruction in excess of the command queuing number.

Furthermore, the instruction storing unit 31a outputs an appropriate executable instruction in response to the output request of an executable instruction of the process executing unit 32a. In this case, an appropriate executable instruction is an executable instruction of which the process priority sequence is high or an oldest executable instruction stored. It is preferable that the selection method of the executable instruction be set in accordance with an operation condition. Moreover, the present embodiment has a configuration that the process executing unit 32a first receives an executable instruction and stores the executable instruction in the instruction storing unit 31a when the executable instruction cannot be processed. However, the present embodiment may have another configuration. For example, the present invention may have a configuration that the instruction storing unit 31a once receives an executable instruction, the process executing unit 32a determines whether the executable instruction can be processed, and the instruction storing unit outputs the executable instruction to the process executing unit 32a when the executable instruction can be processed.

Figure 3:
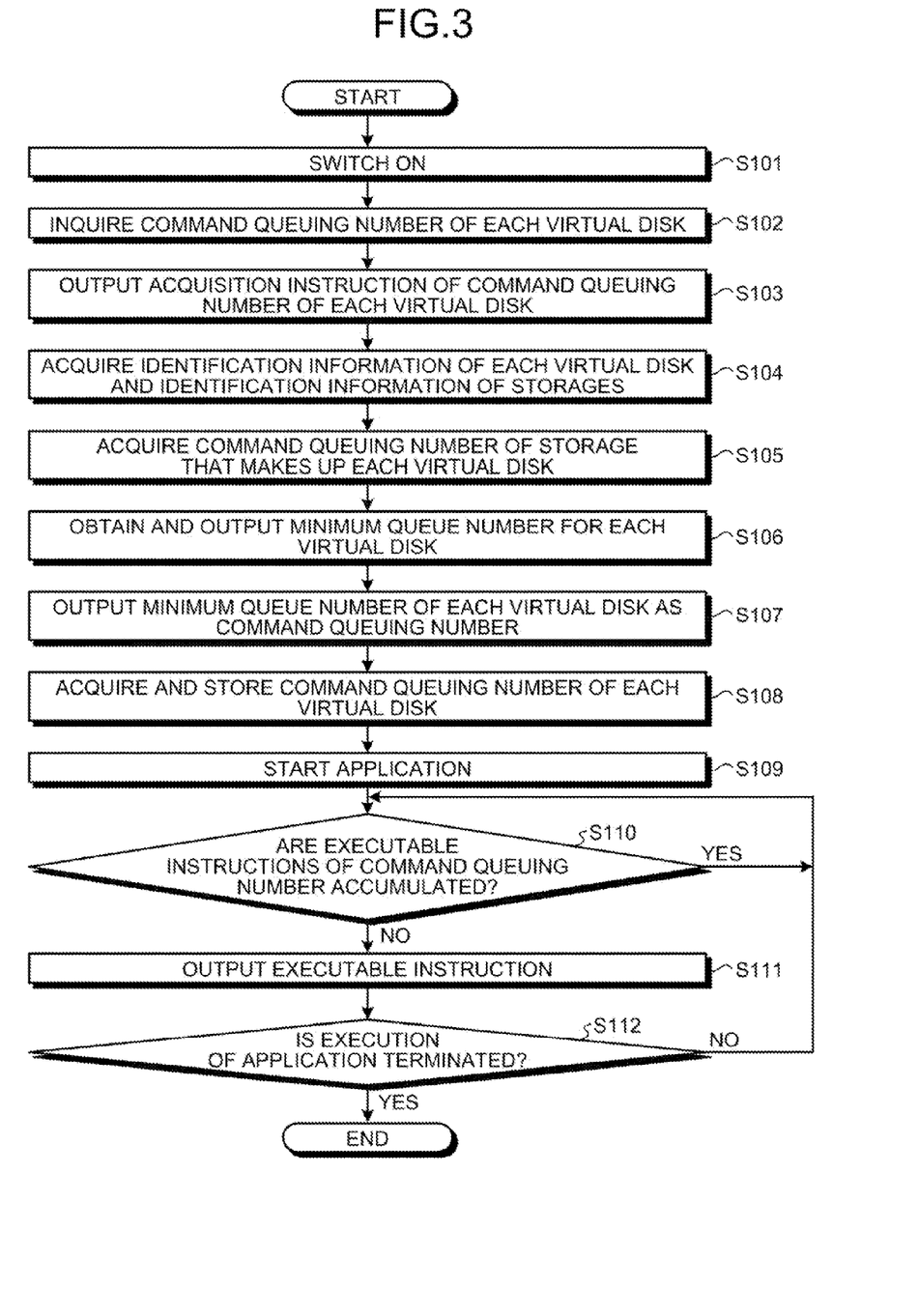
FIG. 3 is a flowchart of the setting of a command queuing number and the execution of an application of the storage system that uses the switching device according to the second embodiment.

Next, it will be explained about the setting of a command queuing number and the execution operation of an application of the storage system that uses the switching device according to the second embodiment with reference to FIG. 3. FIG. 3 is a flowchart illustrating the setting of a command queuing number and the execution of an application of the storage system that uses the switching device according to the second embodiment. As the assumption of the process of FIG. 3, the virtual disk creating unit 11 previously makes up a virtual disk by using a physical disk of the storage 3. Moreover, the virtual disk creating unit 11 stores the identification information of the virtual disk and the identification information of the storages 3 that make up the respective virtual disks.

First, an operator switches on the host 2 (S101). When a power supply is switched on, the command output unit 21 inquires a command queuing number of each virtual disk of the queue number setting unit 14 (S102). The queue number setting unit 14 outputs an acquisition instruction of the command queuing number of each virtual disk to the queue number acquiring unit 12 (S103).

The queue number acquiring unit 12 receives the inquiry of a command queuing number from the queue number setting unit 14 and acquires the identification information of each virtual disk and the identification information of the storages 3 making up the respective virtual disks from the virtual disk creating unit 11 (S104).

The queue number acquiring unit 12 inquires the command queuing number of the storage 3 making up the virtual disk of the storage 3 for each virtual disk. Then, the queue number acquiring unit 12 acquires the command queuing number of the storage 3 that makes up the virtual disk for each virtual disk (S105).

The minimum queue number selecting unit 13 selects, for each virtual disk, the minimum value of the command queuing numbers of the storages 3 that make up the virtual disk as a minimum queue number. The minimum queue number selecting unit 13 then outputs the identification information of the virtual disk and the minimum queue number of the virtual disk to the queue number setting unit 14 in association with each other (S106).

The queue number setting unit 14 receives the minimum queue number of the virtual disk associated with the identification information of each virtual disk from the minimum queue number selecting unit 13. Then, the queue number setting unit 14 outputs the received minimum queue number to the command output unit 21 as a command queuing number in association with the identification information of each virtual disk (S107).

The command output unit 21 receives the association of the identification information of each virtual disk and the command queuing number of the virtual disk from the queue number setting unit 14. Then, the command output unit 21 stores the command queuing number of each virtual disk and the identification information of the virtual disk in association with each other (S108).

The operator makes the executing unit 22 start an application for performing the data reading and writing processes on the virtual disk (S109).

The command output unit 21 determines whether executable instructions corresponding to the defined command queuing number are accumulated on the virtual disk that is the output target of an executable instruction (S110). When it is determined that executable instructions of the command queuing number are accumulated (S110: Yes), the command output unit 21 repeats the determination process of S110. In this case, when the notification that the executable instruction has been processed is received from the response output unit 16, the command output unit 21 can find out that the number of accumulated executable instructions is decreased. Then, when the number of accumulated executable instructions is decreased in the state where the executable instructions of the command queuing number are accumulated, the command output unit 21 can determine that the number of the accumulated executable instructions is smaller than the command queuing number.

On the other hand, when it is determined that the number of the accumulated executable instructions is smaller than the defined command queuing number (S110: No), the command output unit 21 outputs an executable instruction to the instruction output unit 15 (S111).

The executing unit 22 determines whether the execution of the application is terminated (S112). When the application is still being executed (S112: No), the executing unit 22 returns the process control to S110.

On the other hand, when the execution of the application is terminated (S112: Yes), the output of an executable instruction performed by the executing unit 22 and the command output unit 21 is terminated.

Figure 4:
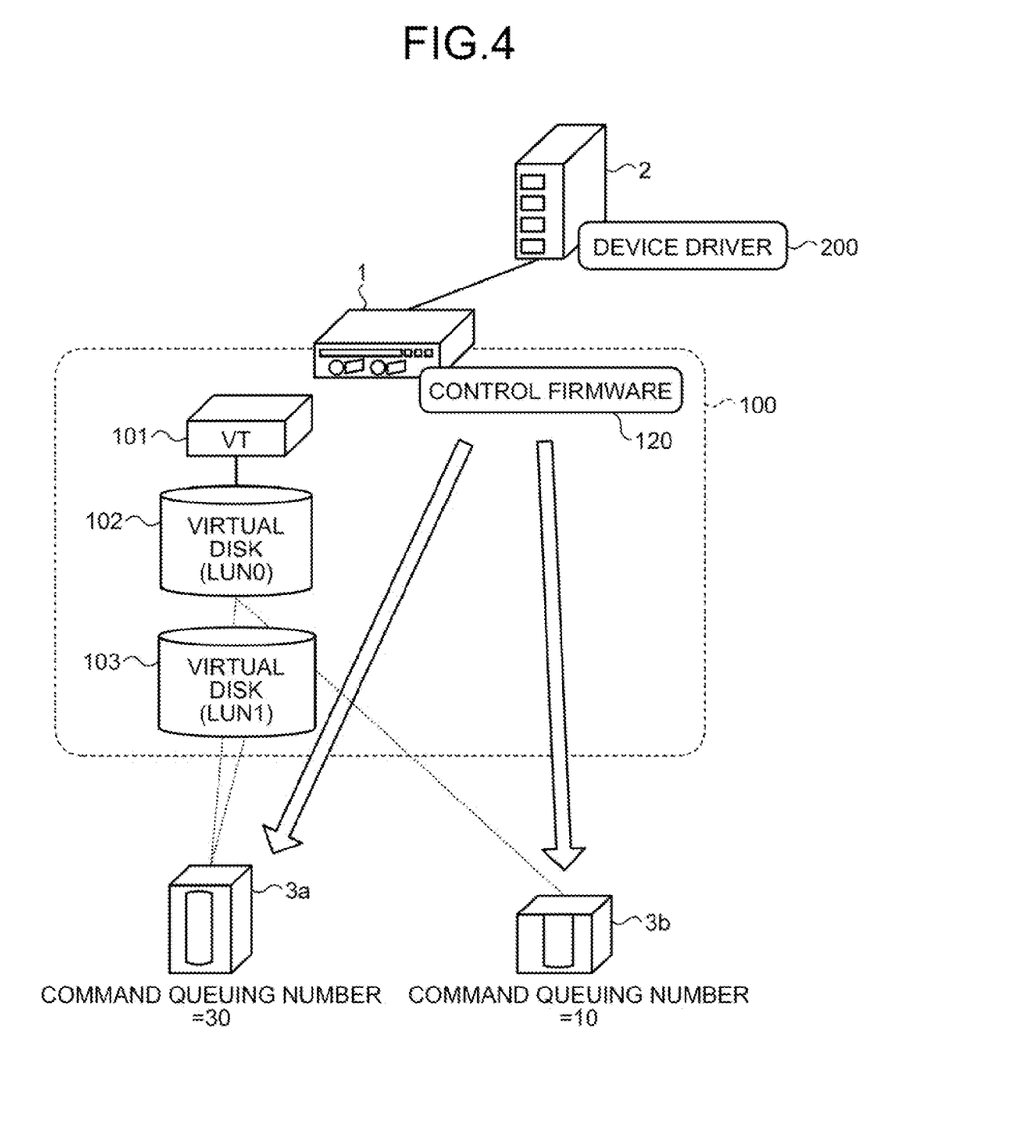
FIG. 4 is a configuration diagram of the storage system that uses the switching device according to the second embodiment.

Next, it is specifically explained about the movement of the storage system that uses the switching device according to the present embodiment with reference to FIG. 4. FIG. 4 is a configuration diagram of the storage system that uses the switching device according to the second embodiment. In this case, two virtual disks of a virtual disk 102 having LUN0 (logical unit number 0) and a virtual disk 103 having LUN1 are created. The command queuing number of the storage 3*a* is "30" and the command queuing number of the storage 3*b* is "10".

The FC switch 1 stores a control firmware 120 that is software for performing the motion control of a switch. The operations of the FC switch 1 are controlled by the control firmware 120. Each operation of the FC switch 1 to be below explained is actually controlled by the control firmware 120. Moreover, the transmission and reception of data performed by the host 2 is controlled by a device driver 200. Each operation of the host 2 to be below explained is actually controlled by the device driver 200.

A VT 101 is a virtual target. A virtual target is a virtual input-output port that transmits and receives data to and from the host 2. The host 2 is connected to the virtual disk 102 or the virtual disk 103 via the VT 101. The host 2 transmits an executable instruction to the FC switch 1 to read or write data from or into the virtual disk 102 or the virtual disk 103 in the state where the connection is established.

In FIG. 4, dotted lines that link the virtual disks 102 and 103 and the storages 3*a* and 3*b* indicate storages that make up the respective virtual disks. The virtual disk 102 is made up of the storage 3*a* and the storage 3*b*. The virtual disk 103 is made up of only the storage 3*a*. In other words, one virtual storage is made up of the VT 101, the virtual disk 102, and the virtual disk 103. The FC switch 1 manages the virtual storage as a virtual storage system 100. The virtual storage system 100 is surrounded with a dotted line in FIG. 4.

When the power supply is switched on, the host 2 inquires the command queuing numbers of the virtual disk 102 that is LUN0 and the virtual disk 103 that is LUN1. After receiving the inquiry, the FC switch 1 first inquires a command queuing number of the storage 3*a* and the storage 3*b* that make up the virtual disk 102 that is LUN0. Then, the FC switch 1 grasps that the command queuing number of the storage 3*a* is "30" and the command queuing number of the storage 3*b* is "10", from the response of the storages 3*a* and 3*b*. Then, the FC switch 1 acquires a minimum queue number. In this case, because the command queuing number of the storage 3*b* is small, the FC switch 1 acquires "10" as a minimum queue number. Similarly, the FC switch 1 inquires a command queuing number of the storage 3*a* that makes up the virtual disk 103 that is LUN1. Then, the FC switch 1 grasps that the command queuing number of the storage 3*a* is "30", from the response of the storage 3*a*. Then, because the command queuing number of the storage 3*a* is the smallest command queuing number, the FC switch 1 acquires "30" as a minimum queue number. In this case, although the FC switch 1 acquires a minimum queue number in accordance with the inquiry of the host 2 in the present embodiment, the FC switch 1 may previously acquire a minimum queue number.

Then, the FC switch 1 outputs "10" to the host 2 as the command queuing number of the virtual disk 102 that is LUN0. Moreover, the FC switch 1 outputs "30" to the host 2 as the command queuing number of the virtual disk 103 that is LUN1. The host 2 stores the command queuing number of the virtual disk 102 that is LUN0 as "10". Moreover, the host 2 stores the command queuing number of the virtual disk 103 that is LUN1 as "30".

Next, it will be explained about the case where the host 2 outputs an executable instruction to the virtual disk 102 or the virtual disk 103.

The host 2 outputs an executable instruction to the virtual disk 102 by using "10" that is the stored command queuing number of the virtual disk 102 as the upper limit of the number of executable instructions that can be waited. Moreover, the host 2 outputs an executable instruction to the virtual disk 103 by using "30" that is the stored command queuing number of the virtual disk 103 as the upper limit of the number of executable instructions that can be waited.

In other words, when the output target of an executable instruction is the virtual disk 102 (LUN0), the host 2 can output the executable instruction by using a command queuing number as "10". Moreover, when the output target of an executable instruction is the virtual disk 103 (LUN1), the host 2 can output the executable instruction by using a command queuing number as "30". In this way, the host 2 can output executable instructions corresponding to different command queuing numbers for each virtual disk, in other words, for each logical unit.

As described above, in the present embodiment, the smallest command queuing number is acquired from command queuing numbers of storages that make up a virtual disk is set as the command queuing number of the virtual disk. As a result, in the present embodiment, the maximum command queuing number that can be used can be set for each virtual disk. The host can output executable instructions to the virtual disk by using the set command queuing number as an upper limit. Therefore, the command queuing performance of storages that make up the storage system can be effectively utilized.

[c] Third Embodiment

Figure 5:
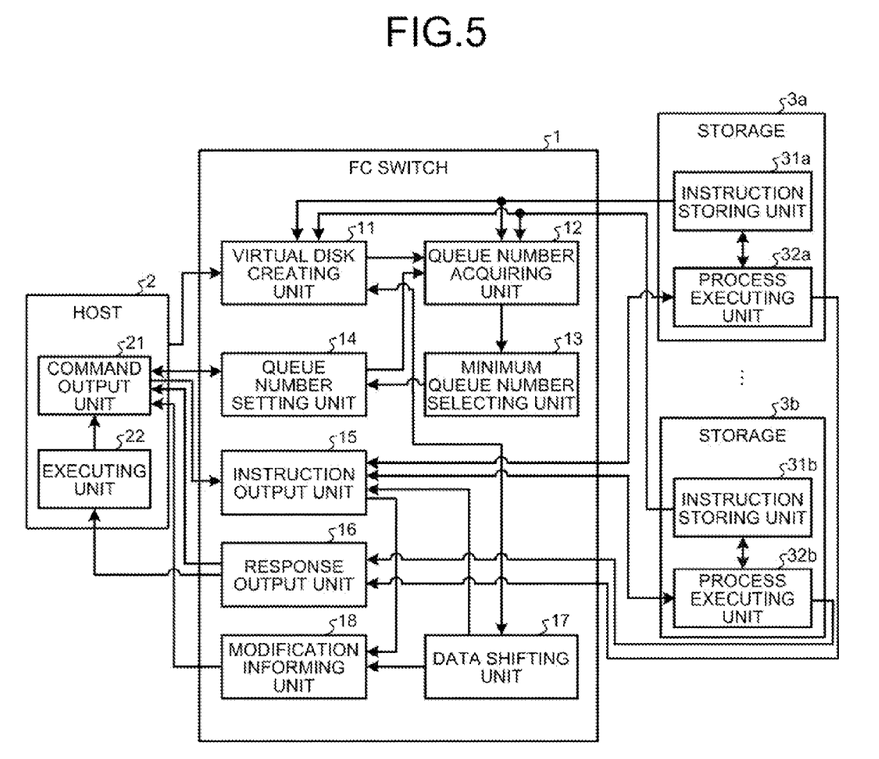
FIG. 5 is a block diagram of a storage system that uses a switching device according to a third embodiment.

FIG. 5 is a block diagram of a storage system that uses a switching device according to the third embodiment. The FC switch 1 according to the present embodiment further includes a data shifting unit 17 and a modification informing unit 18 in addition to the components of the FC switch 1 according to the second embodiment. The function parts having the same reference numbers as those of the second embodiment among the function parts of the present embodiment have similar functions unless its function is particularly explained.

The present embodiment has a configuration that the FC switch 1 shifts data stored in a virtual disk in operation to another virtual disk and further informs the host 2 of the command queuing number of the virtual disk that is the destination of data unlike the second embodiment. In this case, a virtual disk in operation means that physical disks that make up the virtual disk are in an online state. The shift of data may be referred to as "migration" in some cases. Hereinafter, it is mainly explained about the shift of data between virtual disks and the notification of a command queuing number accompanied with the shift of data.

In this case, the present embodiment also has a configuration that a virtual disk is created by the virtual disk creating unit 11 provided in the FC switch 1. However, the virtual disk creating unit 11 may not be provided in the FC switch 1.

The data shifting unit 17 reads out data from one operating virtual disk among virtual disks that are created by the virtual disk creating unit 11. Hereinafter, the data is referred to as "shift target data". The data shifting unit 17 writes the read shift target data into the other virtual disk.

Furthermore, the data shifting unit 17 outputs, to the instruction output unit 15, the identification information of the shift-destination virtual disk to which the shift target data is shifted. Moreover, the data shifting unit 17 shifts the shift target data to the other virtual disk and outputs the notification that virtual disks that make up a logical unit are modified to the modification informing unit 18.

The instruction output unit 15 receives the identification information of the shift-destination virtual disk from the data shifting unit 17. When the first executable instruction after shift is received from the command output unit 21, the instruction output unit 15 outputs a modification notification instruction to the modification informing unit 18. Moreover, when an executable instruction for the shift target data is received from the command output unit 21, the instruction output unit 15 outputs the executable instruction for the shift target data to the storage 3 that makes up the shift-destination virtual disk. In this case, the first executable instruction described above may be an executable instruction for shift target data.

The modification informing unit 18 receives the notification that the virtual disks that make up the logical unit are modified from the data shifting unit 17. The modification informing unit 18 then stores the modification of a command queuing number according to the modification of the virtual disks as the new status information of a system. In this case, status information is information that indicates a state such as the configuration of a system. For example, status information includes information such as the modification of a command queuing number. Then, the modification informing unit 18 receives the modification notification instruction from the instruction output unit 15 and outputs the notification that it has the new status information of the system to the command output unit 21. Then, the modification informing unit 18 receives the acquisition request of status information from the command output unit 21 and outputs the modification notification of a command queuing number to the command output unit 21.

When the modification notification of a command queuing number is received from the modification informing unit 18, the command output unit 21 inquires the command queuing number of each virtual disk of the queue number setting unit 14. Then, the command output unit 21 receives the command queuing number of each virtual disk from the queue number setting unit 14. The acquisition of a command queuing number performed by the command output unit 21 is executed by the same operation as that of the acquisition of a command queuing number explained in the first embodiment.

Then, when the executable instruction for the shift target data is received from the executing unit 22, the command output unit 21 outputs an executable instruction to the instruction output unit 15 by using the command queuing number of the shift-destination virtual disk as an upper limit. At this time, in the present embodiment, the command output unit 21 designates the shift target data stored in the virtual disk before shift as the target of an executable instruction. In this way, even if the command output unit 21 designates the shift target data stored in the virtual disk before shift as the target of an executable instruction, there is not a problem because the instruction output unit 15 outputs an executable instruction with respect to the shift target data stored in the shift-destination virtual disk.

Figure 6:
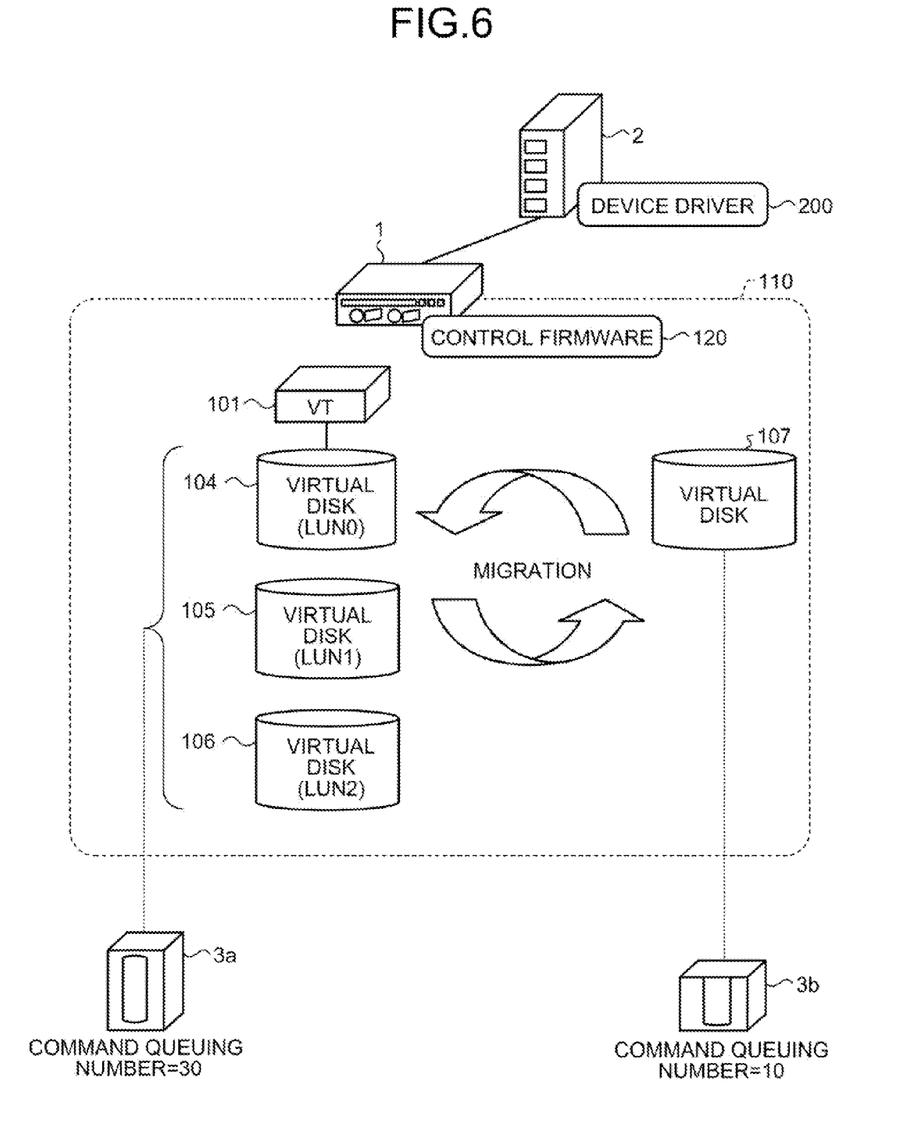
FIG. 6 is a configuration diagram of the storage system that uses the switching device according to the third embodiment.

Now, it is specifically explained about the movement of the storage system that uses the switching device according to the present embodiment with reference to FIG. 6. FIG. 6 is a configuration diagram of the storage system that uses the switching device according to the third embodiment. It is explained about the case where data is shifted from a virtual disk 104 that is made up of the storage 3a to a virtual disk 107 that is made up of the storage 3b. The command queuing number of the storage 3a is "30" and the command queuing number of the storage 3b is "10". The FC switch 1 manages each virtual storage as a virtual storage system 110. The virtual storage system 110 is surrounded with a dotted line in FIG. 6.

The FC switch 1 stores therein the control firmware 120. Then, the operations of the FC switch 1 are controlled by the control firmware 120. Each operation of the FC switch 1 to be below explained is actually controlled by the control firmware 120. Moreover, the transmission and reception of data performed by the host 2 are controlled by the device driver 200. Each operation of the host 2 to be below explained is actually controlled by the device driver 200.

The VT 101 is a virtual target. The host 2 is connected to the virtual disk 104 that is LUN0, a virtual disk 105 that is LUN1, and a virtual disk 106 that is LUN2 via the VT 101. The host 2 transmits an executable instruction to the FC switch 1 to read or write data from or into the virtual disks 104 to 106 in the state where the connection is established.

A dotted line that links the virtual disks 104 to 106 and the storage 3a of FIG. 6 and a dotted line that links the virtual disk 107 and the storage 3b indicate storages that make up the respective virtual disks. The virtual disks 104 to 106 are made up of the storage 3a. The virtual disk 107 is made up of the storage 3b.

In the state before shifting data, the virtual disk 104 that is LUN0 first stores therein shift target data. The command queuing numbers of the virtual disks 104 to 106 are "30" that is the command queuing number of the storage 3a. In this state, the host 2 outputs an executable instruction for the shift target data stored in the virtual disk 104 by using the upper limit of executable instructions that can be waited as "30". Moreover, the host 2 performs the output of an executable instruction on the virtual disk 105 and the virtual disk 106 by using the upper limit of executable instructions to be waited as "30".

Then, during the operation of the virtual disk 104, the shift target data is shifted from the virtual disk 104 to the virtual disk 107. As a result, the virtual disk 107 becomes LUN0. Then, the virtual disk 107 stores therein the shift target data.

Because the virtual disk 107 is made up of only the storage 3b, its command queuing number is the same as the command queuing number "10" of the storage 3b. Therefore, due to the shift, the shift target data is stored in the virtual disk 107 of which the command queuing number is "10". When the shift is performed, the virtual disk 107 is connected to the host 2 via the VT 101 as a virtual disk that is LUN0. In other words, when the executable instruction for the shift target data stored in LUN0 is output from the host 2 in the state after shift, the virtual disk 107 is a target that receives an actual executable instruction.

When a reading instruction for data is received from the host 2 after the data is shifted from the virtual disk 104 to the virtual disk 107, the FC switch 1 informs the host 2 of the information for the shift of data. Then, when the shift of data is performed, the host 2 acquires, from the FC switch 1, the command queuing numbers of the virtual disk 107 that is LUN0, the virtual disk 105 that are LUN1, and the virtual disk 106 that is LUN2. At this time, the host 2 acquires "10" as the command queuing number of the virtual disk 107. As a result, the host 2 can output an executable instruction for shift target data by using "10" that is the command queuing number of the virtual disk 107 as the upper limit of executable instructions that can be waited. Moreover, the host 2 acquires "30" as the command queuing numbers of the virtual disk 105 and the virtual disk 106. As a result, the host 2 can output an executable instruction by using the upper limit of executable instructions that can be waited as "30" for the virtual disk 105 and the virtual disk 106. In this case, in the present embodiment, the host 2 acquires the command queuing numbers of all the logical drives (LUN0 to LUN2) included in the virtual storage system 110. This may be performed by another method. The host 2 may acquire only the command queuing number of the logical drive (LUN0) of which the command queuing number is modified and may use the already-acquired command queuing number for the other logical drives (LUN1 and LUN2).

Figure 7:
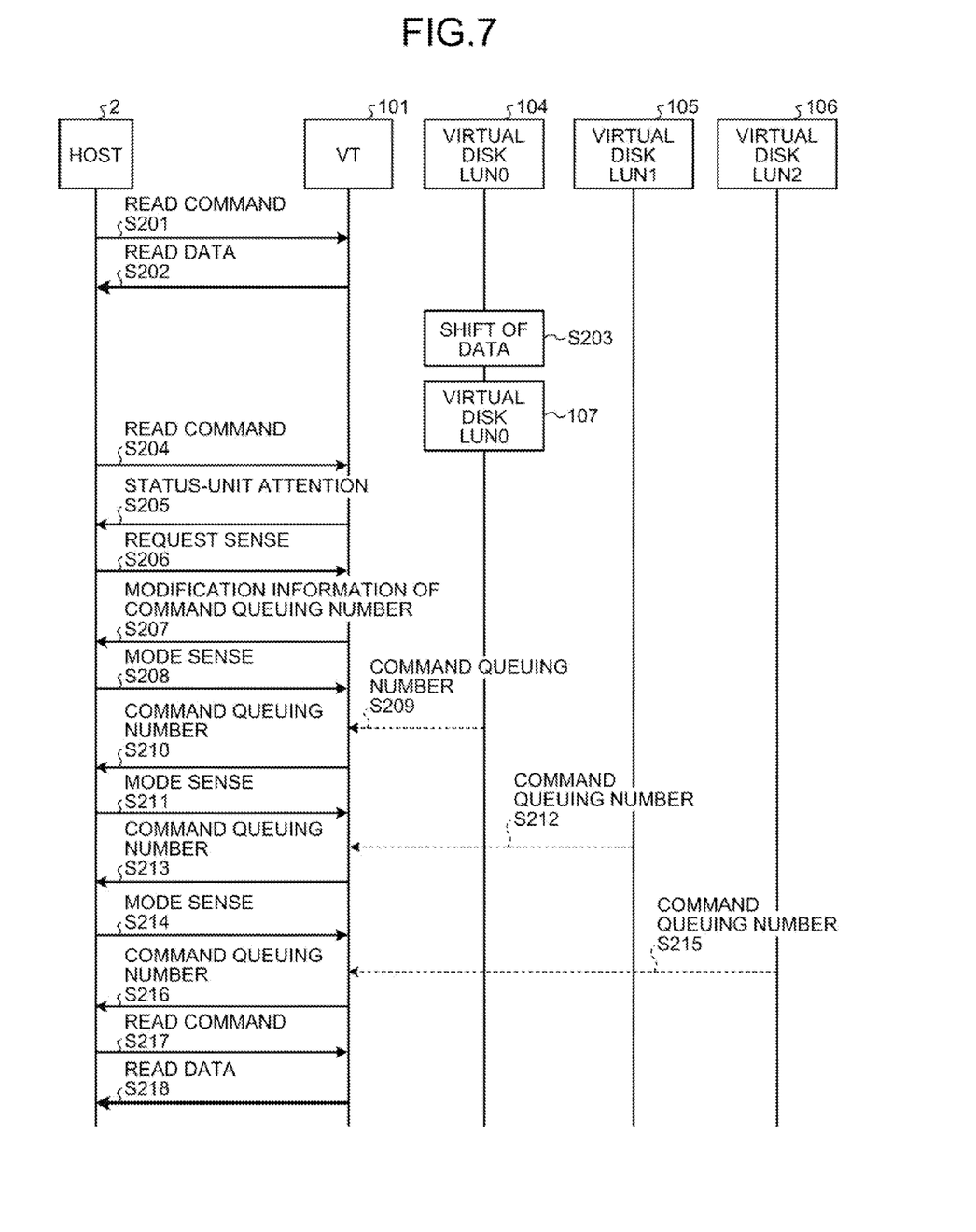
FIG. 7 is a sequence diagram when a command queuing number is reset in the switching device according to the third embodiment.

Next, it will be explained about the flow of setting operations of the command queuing number of the switching device according to the third embodiment with reference to FIG. 7. FIG. 7 is a sequence diagram illustrating the setting of the command queuing number of the switching device according to the third embodiment. In FIG. 7, the temporal operations of the host 2, the VT 101, the virtual disk 104 or the virtual disk 107, the virtual disk 105, and the virtual disk 106 are illustrated from the left edge toward a page space. In this case, because the virtual disk 104 and the virtual disk 107 are replaced by the shift of shift target data on the way to become LUN0 together, they are indicated by one vertical axis. Each of vertical axes indicates that a time passes toward the bottom. Moreover, the operation of the VT 101 to be explained below indicates actually that the FC switch 1 operates via the VT 101. Moreover, it is below explained about a Read Command as an example. A command to be used may be another command such as a Write Command. Furthermore, commands that are used at these steps may be different. Even in FIG. 7, the virtual disks 104 to 106 are made up of the storage 3a and the virtual disk 107 is made up of the storage 3b, similarly to FIG. 6. Moreover, as a precondition to the sequence diagram, it is assumed that the command queuing numbers of the virtual disks 104 to 106 that are LUN0 to LUN2 are set in the host 2.

The host 2 transmits a Read Command to the VT 101 (S201). In this case, all the virtual disks 104 to 106 are virtual disks of which each includes the storage 3a and their command queuing numbers are "30". Therefore, the host 2 sets, to "30", all the command queuing numbers of the virtual disks 104 to 106 that are LUN0 to LUN2 that can be connected via the VT 101. The VT 101 reads out designated data from any of the virtual disks 104 to 106 and outputs the data to the host 2. As a result, the host 2 can perform the reading of data (Read Data) (S202). In this case, the operations at S201 and S202 are an operation after the setting of a command queuing number is terminated before the shift of data or after the shift of data. Therefore, the operations of S201 and S202 are repeated until the shift of data is performed.

The data is shifted from the virtual disk 104 that is LUN0 to the virtual disk 107, and thus the virtual disk 107 becomes LUN0 (S203). In this case, when a command for LUN0 is input from the host 2 during the shift of data of LUN0, the FC switch 1 executes the command on the data of the virtual disk 104. Then, when the executed command is the writing or modification of data, or the like, the FC switch 1 reflects the updating of data performed during the data shift on the data of the virtual disk 107 after the shift of data is completed.

The host 2 outputs a first Read Command after the shift of data to the VT 101 (S204). When the first Read Command after the shift of data is received, the VT 101 outputs the notification response that it has new Status information of a system (S205). The response is, for example, a Unit Attention status. A Unit Attention status is the possibility of modification of a detachable medium or a response indicating that the target of an executable instruction is reset.

The host 2 receives the notification from the VT 101 and outputs the acquisition request of Status information (S206). This is performed by using a command called Request Sense. Then, the VT 101 informs the host that the command queuing number of the virtual disk is modified by using a specified SCSI command that is not used (S207).

The host 2 inquires the command queuing number of the virtual disk 107 that is LUN0 of the VT 101 (S208). In response, the VT 101 acquires the command queuing number from the virtual disk 107 that is LUN0 (S209). Actually, the FC switch 1 performs the acquisition operation of a command queuing number explained in the first embodiment on the virtual disk 107. Because the virtual disk 107 is made up of only the storage 3b, its command queuing number is "10". Therefore, the VT 101 acquires "10" as the command queuing number of the virtual disk 107. Then, the VT 101 informs the host 2 of "10" as the command queuing number of the virtual disk 107 (S210).

Next, the host 2 inquires of the VT 101 the command queuing number of the virtual disk 105 that is LUN1 (S211). In response, the VT 101 acquires the command queuing number from the virtual disk 105 that is LUN1 (S212). Actually, the FC switch 1 performs the acquisition operation of a command queuing number explained in the first embodiment on the virtual disk 105. Because the virtual disk 105 is made up of only the storage 3a, its command queuing number is "30". Therefore, the VT 101 acquires "30" as the command queuing number of the virtual disk 105. Then, the VT 101 informs the host 2 of "30" as the command queuing number of the virtual disk 105 (S213).

Next, the host 2 inquires of the VT 101 the command queuing number of the virtual disk 106 that is LUN2 (S214). In response, the VT 101 acquires the command queuing number from the virtual disk 106 that is LUN2 (S215). Actually, the FC switch 1 performs the acquisition operation of a command queuing number explained in the first embodiment on the virtual disk 106. Because the virtual disk 106 is made up of only the storage 3a, its command queuing number is "30". Therefore, the VT 101 acquires "30" as the command queuing number of the virtual disk 106. Then, the VT 101 informs the host 2 of "30" as the command queuing number of the virtual disk 106 (S216).

After the command queuing numbers of the virtual disks 105 to 107 that are LUN0 to LUN2 are acquired, the host 2 again outputs a Read Command to the VT 101 (S217). The VT 101 acquires data designated by the received Read Command from any of the virtual disks 105 to 107 and outputs the data to the host 2. As a result, the host 2 can perform the reading of data (Read Data) (S218).

In this regard, even if the shift of data is performed, the device driver has conventionally grasped the storage destination of shift target data as the same virtual disk. Therefore, the device driver cannot grasp that a storage device that makes up the virtual disk is modified. Therefore, a command queuing number cannot be conventionally modified in accordance with the shift of data between virtual disks.

On the contrary, as described above, according to the third embodiment, the host can grasp the modification of the command queuing number of a shift-destination virtual disk when the shift of data is performed from an operating virtual disk to another virtual disk. As a result, the host can output an executable instruction for the data by using the command queuing number of the shift-destination virtual disk as an upper limit. Therefore, even when the shift of data is performed, a command queuing performance of storages that make up the storage system can be effectively utilized.

Although it has been explained about the case where any of virtual disks is made up of only one storage in the present embodiment, the number of storages that make up a virtual disk may be actually two or more. In that case, the minimum value of the command queuing numbers of storages that make up each virtual disk becomes the command queuing number of the virtual disk. Each virtual disk also includes a shift-destination virtual disk after the shift of data.

According to an aspect of the switching device, the switch control method, and the storage system disclosed in the present application, the minimum value of command queuing numbers of storage devices that make up the respective virtual disks can be automatically set as a command queuing number of the virtual disk. In other words, according to each aspect disclosed in the present application, the maximum command queuing number that can be used by each virtual disk can be automatically set. As a result, a command queuing performance of storage devices that make up the storage system can be effectively utilized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching device comprising:
   a queue number acquiring unit that acquires command queuing numbers in a plurality of storage devices that make up a virtual disk, each of the command queuing numbers indicating an upper limit of a number of process-waiting instructions that can be stored in the corresponding storage device;
   a selecting unit that selects a minimum value in the command queuing numbers acquired from the storage devices;
   a queue number setting unit that sets the selected minimum value as a command queuing number indicating an upper limit of a number of process-waiting instructions which is stored in the virtual disk;
   a data shifting unit that shifts data from one virtual disk to another virtual disk among virtual disks; and
   a modification informing unit that informs, when the shift of data is performed, a computation device that is connected to the switching device of status modification of the virtual disk that stores the data, wherein
   when a setting request of a command queuing number of the virtual disk to which the data is shifted is received from the computation device that receives the status modification,
   the queue number acquiring unit acquires a command queuing number of each of the storage devices that make up the virtual disk to which the data is shifted,
   the selecting unit selects a minimum value in the command queuing numbers acquired from the storage devices that make up the virtual disk to which the data is shifted, and
   the queue number setting unit sets the selected minimum value as the command queuing number of the virtual disk to which the data is shifted.

2. The switching device according to claim 1, wherein the queue number setting unit receives an output request of the command queuing number of the virtual disk from a computation device that is connected to the switching device and outputs the selected minimum value to the computation device as the command queuing number of the virtual disk for which the minimum value is selected in order to set the command queuing number.

3. A switch control method comprising:
   acquiring command queuing numbers in a plurality of storage devices that make up a virtual disk, each of the command queuing numbers indicating an upper limit of a number of process-waiting instructions that can be stored in the corresponding storage device;
   selecting a minimum value in the command queuing numbers acquired from the storage devices;
   setting the selected minimum value as a command queuing number indicating an upper limit of a number of process-waiting instructions which is stored in the virtual disk;
   shifting data from one virtual disk to another virtual disk among virtual disks;
   informing, when the shift of data is performed, a computation device that is connected thereto of status modification of the virtual disk that stores the data;

receiving a setting request of a command queuing number of the virtual disk to which the data is shifted from the computation device that receives the status modification;

acquiring a command queuing number of each of the storage devices that make up the virtual disk to which the data is shifted when the request is received;

selecting a minimum value of the command queuing numbers acquired from the storage devices that make up the virtual disk to which the data is shifted; and setting the selected minimum value as the command queuing number of the virtual disk to which the data is shifted.

4. A storage system comprising a computation device; a switching device; and a plurality of storage devices, wherein the computation device includes a command output unit that outputs instructions for reading and writing data from and into the storage devices to the switching device, the switching device includes
  a queue number acquiring unit that acquires command queuing numbers in a plurality of storage devices that make up a virtual disk, each of the command queuing numbers indicating an upper limit of a number of process-waiting instructions that can be stored in the corresponding storage device;
  a selecting unit that selects a minimum value in the command queuing numbers acquired from the storage devices;
  a queue number setting unit that sets the selected minimum value as a command queuing number indicating an upper limit of a number of process-waiting instructions which is stored in the virtual disk;
  a data shifting unit that shifts data from one virtual disk to another virtual disk among virtual disks; and
  a modification informing unit that informs, when the shift of data is performed, the computation device of status modification of the virtual disk that stores the data, wherein
    when a setting request of a command queuing number of the virtual disk to which the data is shifted is received from the computation device that receives the status modification,
    the queue number acquiring unit acquires a command queuing number of each of the storage devices that make up the virtual disk to which the data is shifted,
    the selecting unit selects a minimum value in the command queuing numbers acquired from the storage devices that make up the virtual disk to which the data is shifted, and
    the queue number setting unit sets the selected minimum value as the command queuing number of the virtual disk to which the data is shifted, the storage device includes
  an instruction storing unit that stores therein the input instructions; and
  a process executing unit that sequentially processes the stored instructions, and the command output unit outputs the instructions by using the set command queuing number as the upper limit of the number of the process-waiting instructions of each virtual disk.

5. A storage system comprising:

a command output unit that outputs instructions for reading and writing data from and into a plurality of storage devices, a queue number acquiring unit that acquires command queuing numbers in the storage devices that make up a virtual disk, each of the command queuing numbers indicating an upper limit of a number of process-waiting instructions that can be stored in the corresponding storage device;

a selecting unit that selects a minimum value in the command queuing numbers acquired from the storage devices;

a queue number setting unit that sets the selected minimum value as a command queuing number indicating an upper limit of a number of process-waiting instructions which is stored in the virtual disk;

a data shifting unit that shifts data from one virtual disk to another virtual disk among virtual disks;

a modification informing unit that informs, when the shift of data is performed, the computation device of status modification of the virtual disk that stores the data;

an instruction storing unit that stores therein the input instructions; and a process executing unit that sequentially processes the stored instructions, wherein
  when a setting request of a command queuing number of the virtual disk to which the data is shifted is received from the computation device that receives the status modification,
  the queue number acquiring unit acquires a command queuing number of each of the storage devices that make up the virtual disk to which the data is shifted,
  the selecting unit selects a minimum value in the command queuing numbers acquired from the storage devices that make up the virtual disk to which the data is shifted, and
  the queue number setting unit sets the selected minimum value as the command queuing number of the virtual disk to which the data is shifted, and
  the command output unit outputs the instructions by using the set command queuing number as the upper limit of the number of the process-waiting instructions of each virtual disk.

* * * * *